United States Patent [19]

Matsuno et al.

[11] Patent Number: 4,595,326
[45] Date of Patent: Jun. 17, 1986

[54] METHOD OF MAKING WELDED CAN BODY

[75] Inventors: Kenji Matsuno, Yokohama; Kazuhisa Ishibashi, Tokyo, both of Japan

[73] Assignee: Toyo Seikan Kaisha, Limited, Japan

[21] Appl. No.: 648,214

[22] Filed: Sep. 7, 1984

[30] Foreign Application Priority Data

Sep. 9, 1983 [JP] Japan .................. 58-165230

[51] Int. Cl.⁴ .................. B23K 11/06
[52] U.S. Cl. .................. 413/1; 219/64; 219/108; 413/72
[58] Field of Search .................. 413/1, 69, 70, 71, 72; 219/64, 108

[56] References Cited

U.S. PATENT DOCUMENTS

| | | | |
|---|---|---|---|
| 4,329,560 | 5/1982 | Tanuma | 219/108 |
| 4,334,138 | 6/1982 | Matsuno et al. | 219/64 |
| 4,404,447 | 9/1983 | Kitamura et al. | 219/64 |
| 4,414,455 | 11/1983 | Schneider et al. | 219/64 |

FOREIGN PATENT DOCUMENTS 25886 2/1983 Japan .................. 219/64

Primary Examiner—Francis S. Husar
Assistant Examiner—Jerry Kearns
Attorney, Agent, or Firm—Armstrong, Nikaido, Marmelstein & Kubovcik

[57] ABSTRACT

There is provided a method of making a welded can body having a mash seam weld which includes a heat affected zone extending continuously in the longitudinal direction thereof and is formed with no pitting. The weld is formed by mash seam welding a lapped portion of a can body preform made of a surface treated steel sheet while allowing an alternating current to flow through the lapped portion via a water-cooled elongated electrode and a water-cooled rotary electrode. The alternating current has a crest factor satisfying an expression $1.5 \leq Ip/Ie \leq 2.0$, where Ie and Ip designate an effective value and a peak value, respectively, of the alternating current.

6 Claims, 8 Drawing Figures

METHOD OF MAKING WELDED CAN BODY

BACKGROUND OF THE INVENTION

This invention relates to a method of making a welded can body, more particularly, to a method of making a welded can body having a mash seam weld.

In case of a welded can body which was made by forming a can body preform having a side lapped portion from a blank of a surface treated steel sheet, e.g. tinplate, tinfree steel and a thin-nickel-plated steel or the like, without removing the surface treated film thereof such as a chromium surface layer from the marginal edges forming the side lapped portion, and mash seam welding the lapped portion, it is desirable that the heat affected zone in the weld is continuous in the longitudinal direction thereof, so as to assure sealability in a worked portion such as a flange portion, a necked-in portion and a beaded portion.

In this specification, the heat affected zone is defined as a region where some change occurred in the structure thereof due to thermal hysteresis during welding, presumably by being heated to a temperature of about 1000° C. or above. The boundary surfaces of the lapped portion corresponding to the heat affected zone are united with solid phase weld and/or melt weld to form a firm junction.

When etched with 5% alcoholic solution of picric acid for 2 minutes, a black area $2a$, and a gray and/or white area $2b$ surrounded by the black area $2a$ are observed in microscopic photographs (refer to FIGS. 1 and 2) of about 50 times magnification. These areas $2a$, and $2b$ constitute the heat affected zone 2 described herein. The black area $2a$ is supposed to mainly comprise fine precipitates of carbide (including the one in a prodromal stage), and the white area $2b$ mainly comprise dendrite structure formed by rapid cooling after melting during welding.

A portion of the weld with a heat unaffected zone usually has a poor jointing strength, since iron atoms in the vicinity of the original boundary surfaces have diffused only insufficiently.

Therefore, there has arisen such a trouble that, when a working such as beading, necking, or flanging has been performed on the welded can body, the portions of the weld corresponding to the original boundary surfaces in the heat unaffected zones have peeled off to allow the contents filled in the can to leak or to allow the air to enter the can through the peeled portions, resulting in poor sealability. In case of a tinplate with a normal amount of tin coating (from about 1.0 to 10.2 g/m$^2$), however, usually the formation of heat unaffected zones would have hardly caused such defects as described above, because a relatively high amount of tin with a low melting point would have supposedly promoted the diffusion of iron atoms.

The continuous heat affected zone as above described may be obtained by mash seam welding the lapped portion of a can body preform by means of an electrode means comprising a cooled (e.g. water cooled) elongated electrode and a cooled rotary electrode having a relatively large radius, preferably of at least 50 mm, preferably having wire electrodes interposed between the lapped portion and the respective electrode, as indicated in U.S. Pat. No. 4,334,138.

However, by only using the aforementioned electrode means, the continuous heat affected zone is not always obtained, and even if obtained, splashes and/or extrusions of molted iron will be caused under inadequate welding conditions, and make it difficult to repair the welds by coating lacquers or the like, resulting in poor corrosion resistance.

Further, it was found that, even if the continuous heat affected zone has been obtained, when conventional sinusoidal alternating current is used for welding, especially when sinusoidal alternating current with high frequency is used for high-speed manufacturing of welded can bodies, a surface pitting 3 due to local melt is produced independent of the heat affected zone 2 in the surface of the mash seam weld 1 on the side of the rotary electrode 5, as shown in FIGS. 1 and 2 (magnification, X50; both etched with 5% alcoholic solution of picric acid for 2 minutes.)

In the figures, reference numbers 4 and 5 designate elongated and rotary electrodes, respectively, and 6 and 7 wire electrodes made of annealed copper wires rolled flat and, as occasion demands, coated with a low melting point metal, e.g., tin. The pitting 3 is mainly produced in the region normally called a shoulder portion corresponding to the neighborhood of the part where the edge face of one side in the lapped portion and the surface of the other side contact with each other.

The pitting 3 not only injures the appearance of a welded can body, but also tends to induce rusting and pinhole corrosion even after the weld 1 has been coated with an organic film, and to cause rupture when the pitting 3 is deep and an area including the pitting 3 has been subjected to beading or the like.

SUMMARY OF THE INVENTION

It is an object of the invention to provide a method of making a welded can body formed with a mash seam weld which is free from defects such as splashes, extrusions of molten iron and pittings, and has a heat affected zone extending axially continuously.

According to the invention there is provided a method of making a welded can body having a mash seam weld which includes a heat affected zone extending continuously in the longitudinal direction thereof and is formed with no pitting, the mash seam weld being formed by mash seam welding a lapped portion of a can body preform made of a surface treated steel sheet while allowing an alternating current to flow through the lapped portion via a water-cooled elongated electrode, a water-cooled rotary electrode having a radius larger than 50 mm and opposing the elongated electrode, and a first wire electrode and a second wire electrode interposed between the lapped portion and, the elongated electrode and said rotary electrode, respectively, wherein the alternating current has a crest factor satisfying an expression $1.5 \leq I_p/I_e \leq 2.0$, where $I_e$ and $I_p$ designate an effective value and a peak value, respectively, of the alternating current;

a contact length L (in mm) between the lapped portion and the rotary electrode satisfies an expression $3 \text{ mm} \leq L \leq 10 \text{ mm}$; and a welding pitch P (mm), defined by an equation $P = v/120f$, where v and f designate a welding speed (mm/min) and a frequency (Hz) of the alternating current, satisfies an expression $0.054 L + 0.625 \text{ mm} < P < 0.213 L + 0.870 \text{ mm}$.

Other objects and advantages of the invention will be apparent from the following description, which, taken in connection with the accompanying drawings, discloses preferred embodiments thereof.

DETAILED DESCRIPTION OF THE PREFERRED EMBODIMENT

Figure 3:
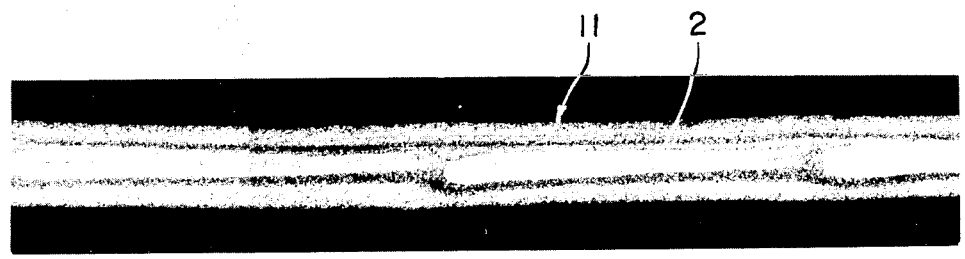
FIG. 3 is a microscopic photograph of the longitudinal section of a weld of an example of a welded can body made according to the invention, taken along a line corresponding to the line II—II in FIG. 1.

Referring to FIG. 3 which illustrates an example of a mash seam weld of a welded can body made from a surface treated steel sheet according to the invention, a heat affected zone 2 is formed substantially uniformly and continuously in the longitudinal direction of the weld 11, and no pitting is generated on the surfaces of the weld 11.

The surface treated steel sheet comprises a low-tin tinplate, a thin-nickel-plated steel sheet and tinfree steel. In this specification, a tin plated steel sheet with a tin layer of about 0.3 to 0.8 g/m² and further with a chrome oxide layer of 3 to 20 mg/m² in terms of chrome amount thereon is designated as low-tin tinplate, where normally most part of tin is present in the form of a tin-iron alloy layer. A surface treated steel sheet having an electroplated nickel layer or a nickel-iron alloy layer each containing from about 0.1 to 0.8 g/m² nickel and further a chrome oxide layer (of about 3 to 20 mg/m² in terms of chrome amount) formed thereon is referred to as thin-nickel-plated steel sheet. Further, a surface treated steel sheet having a from about 30 to 300 mg/m² metallic chrome layer and further a chrome oxide layer (from 5 to 40 mg/m² in terms of chrome amount) formed thereon is referred to as tinfree steel.

Preferred welding conditions for forming the weld 11 from a lapped portion of from 0.15 to 0.55 mm width at high speed, accordingly with a current of a relatively high frequency (e.g., from 200 to 600 Hz) will be described below.

It is desirable that the mash seam weld 11 be from 1.2 to 1.6 times as thick as the blank which is normally 0.12 to 0.40 mm thick, and the welding force be about 60 to 200 kg.

Figure 4:
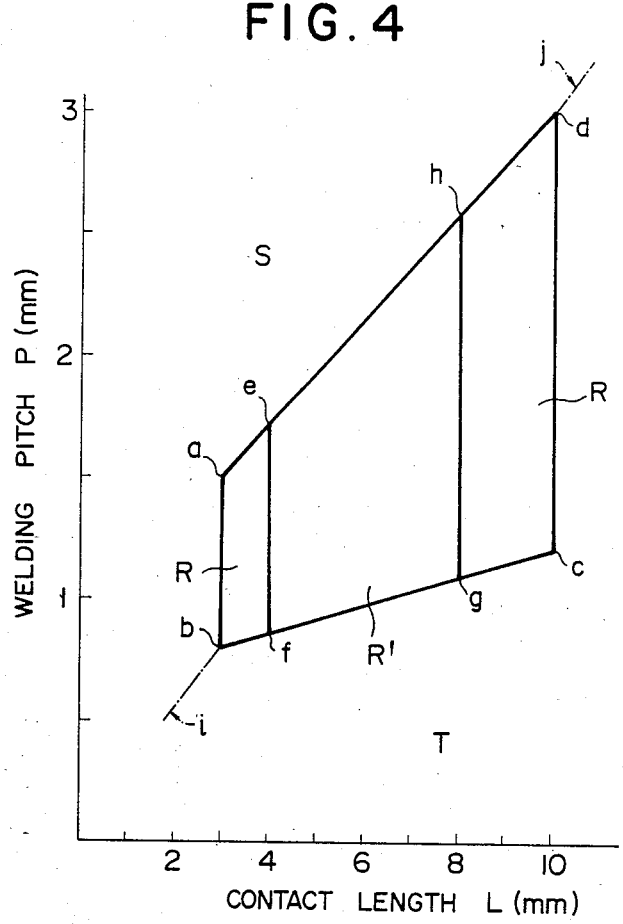
FIG. 4 is a diagram showing a preferred ranges of a contact length and a welding pitch in the method according to this invention.

To form a continuous heat affected zone 2, it is desirable that a welding pitch P (mm) (a length of a portion of the weld 1 corresponding to a half-wave length of welding alternating current) defined by the following equation (1), be relatively long and will exist in an area R surrounded by line segments connecting any two adjacent points with each other among points a, b, c, and d shown in FIG. 4, i.e., be from 0.8 to 3.0 mm long. Further, the welding pitch P preferably exists in an area R' surrounded by line segments connecting any two adjacent points with each other among points e, f, g, and h, i.e., the welding pitch P is preferably from about 0.9 to 2.6 mm long.

$$P = v/120f \tag{1}$$

where v and f denote the welding speed (mm/min) and frequency (Hz) of the welding a.c., respectively. The range of a desirable value of the frequency for a given welding speed is determined on the basis of the equation (1).

Figure 6:
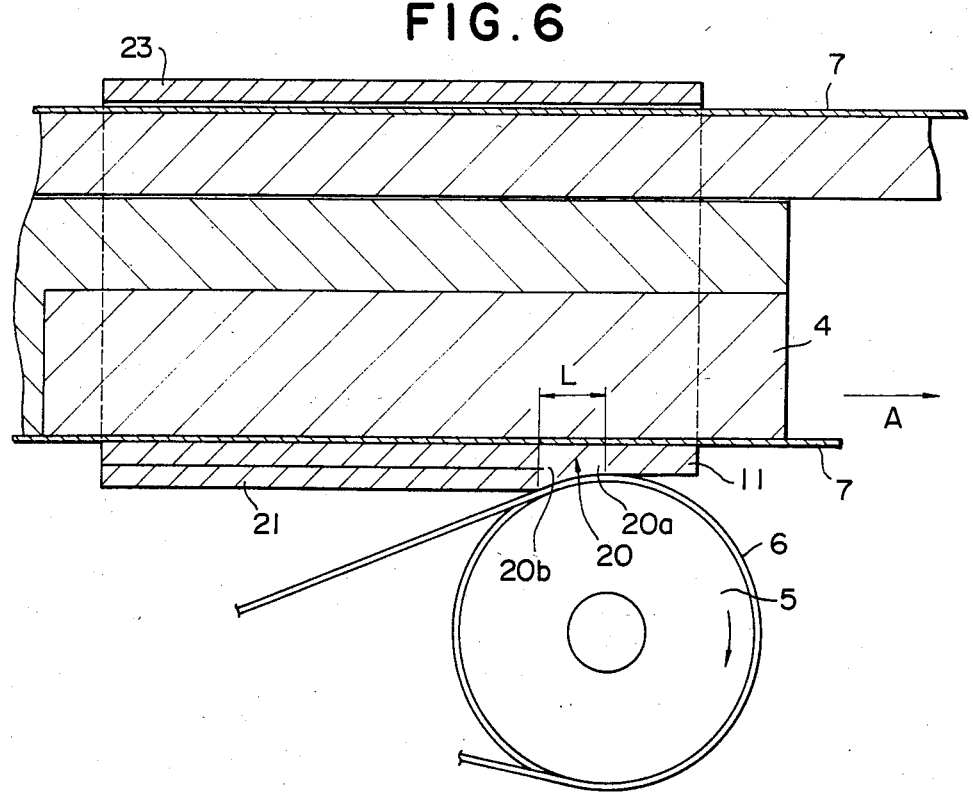
FIG. 6 is an explanatory front view, partly in section, illustrating an example of the process where the welded can body is made according to this invention.

In addition, to form a continuous heat affected zone 2, it is preferable that, in relation to the welding pitch P, a contact length L (mm) shown in FIG. 6 (where flattening of the electrode by the welding force is not taken into consideration) taken in the axial direction between the lapped portion 21 under welding and the rotary electrode 5 be present in the area R shown in FIG. 4, i.e., be from 3 to 10 mm, and desirably be present in the area R', i.e., be from 4 to 8 mm. That is, it is preferable that the welding pitch P (mm) and contact length L (mm) be within the ranges defined by the following expressions (2) and (3):

$$0.054L + 0.625 \text{ mm} < P < 0.213L + 0.870 \text{ mm} \tag{2}$$

$$3 \text{ mm} \leq L \leq 10 \text{ mm} \tag{3}$$

In an area S above a polygonal line ibadj in FIG. 4, a continuous heat affected zone can not be formed without producing extreme splashes and extrusion of molten iron. On the other hand, in an area T below the polygonal line ibadj, the formation of the heat affected zone requires an excessive welding current which sometimes overheats the surface of the weld, with the possibility of melting it in the extreme case.

It is desirable that, in accordance with the relatively large contact length L described above, the radius of the rotary electrode 5 be 50 mm or above, these electrodes be cooled (normally with water), and wire electrodes 6, 7 be used for preventing the surfaces of the electrodes from wearing.

Figure 5:
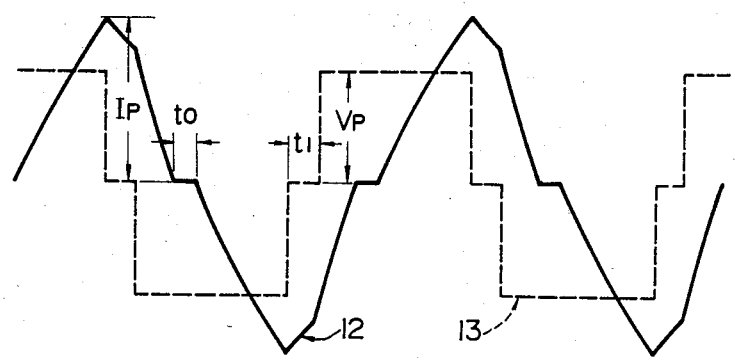
FIG. 5 is a diagram showing an example of the waveform of welding current applied to the method according to this invention.

Elimination of the pitting 3 and splashes in forming a weld having the continuous heat affected zone 2 under the welding conditions described above, requires use of a welding current with a waveform having a crest factor (Ip/Ie) which satisfies the following expression (4), and preferably the following expression (4a), that is, such a waveform as exemplified in FIG. 5:

$$1.5 \leq Ip/Ie \leq 2.0 \tag{4}$$

where Ie and Ip designate an effective value and a peak value, respectively, of the welding alternating current.

$$1.6 \leq Ip/Ie \leq 1.85 \tag{4a}$$

When the value of Ip/Ie is smaller than 1.5, the pitting 3 tends to be produced. For reference, the crest factor of a sine wave is 1.41. Further, when the crest factor Ip/Ie is larger than 2.0, an instantaneous current becomes so large that an overheated zone develops and thus splashes tend to be produced.

The reason why the pitting tends to be produced when Ip/Ie is smaller than 1.5 is not clear, but may be as follows:

It is estimated that in the region 20 where welding is proceeding in the lapped portion 21 in FIG. 6, as the value of Ip/Ie decreases less than 1.5, a current density through a downstream portion 20a of the region 20, where welding has been substantially completed increases, and a current density through an upstream portion 20b of the region 20, where welding has not yet performed sufficiently decreases by the amount corresponding to the above increment. As a result a growth of a high temperature portion to become the heat affected portion in the welding direction is suppressed in the region 20.

So as to develop the high temperature portion for forming a continuous heat affected portion, it is necessary to increase Ie of the current flowing through the region 20. In this case the surface of the region 20, especially of the downstream portion 20a opposing the rotary electrode 5 where cooling is not sufficient, tends to be overheated, and the pitting will be caused on the above surface when a peak current flows through the downstream portion 20a.

This invention is not restricted to the embodiments described above and, for example, is applicable to a variety of surface treated steel sheets including tinplate with a normal tin coating weight.

Example according to this invention will be described hereafter.

EXAMPLE

A blank of a tinfree steel of 0.22 mm thick having a metallic chrome layer of 100 mg/m$^2$ and a chromium oxide layer of 15 mg/m$^2$ (in terms of chrome amount) was rounded (without removing the chromium surface layer over the margins of the blank) to form a can body preform 23 of 125.4 mm high and 65.3 mm inner diameter, having a lapped portion 21 of 0.35 mm wide, as shown in FIG. 6.

Figure 7:
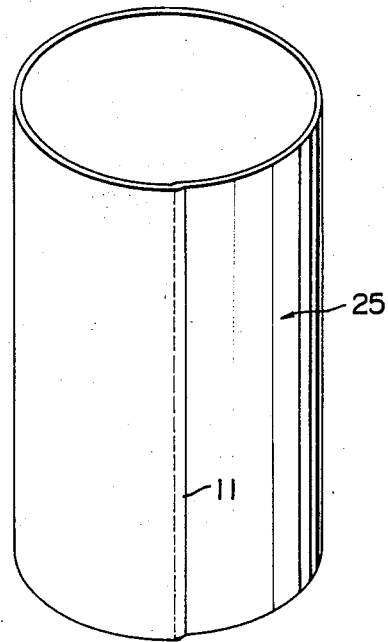
FIG. 7 is a perspective view of an example of a welded can body made according to this invention.

The lapped portion 21 of the can body preform 23 was mash seam welded by means of an elongated electrode 4 and a rotary electrode 5 of 75 mm radius via wire electrodes 6 and 7, while the elongated electrode 4 is moved in the arrow direction A, under the welding conditions mentioned below to make a welded can body 25 with a weld 11 of 0.26 mm thick, as shown in FIG. 7. The wire electrodes 6, 7 were formed of an about 2 mm wide flat rolled, annealed copper wire with an oval section and a flt surface abutting against the lapped portion 21.

The welding conditions are as follows: The welding force, welding speed, and frequency of welding current are 100 kg, 60 m/min, and 400 Hz, respectively. The waveform 12 of the current is shown in FIG. 5, where $t_0=0.17$ msec and $t_1=0.21$ msec. The crest factor (Ip/Ie), the effective value (Ie) of the current, and the welding pitch were 1.75, 4.9 kA, and 1.25 mm, respectively.

The welding current with the waveform 12 is preferably produced as described below.

Figure 1:
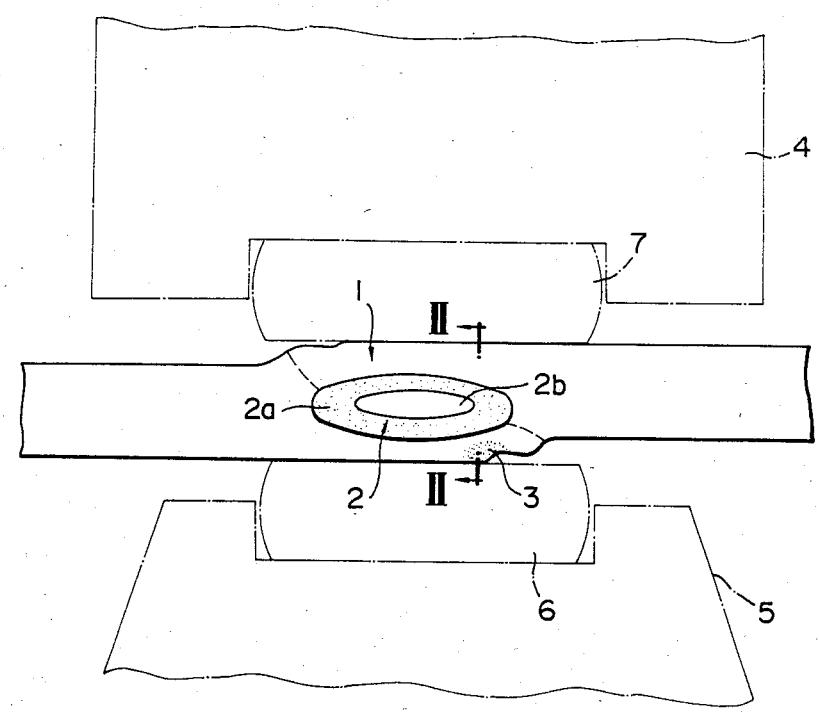
FIG. 1 is a vertical section of the area near the weld of a welded can body with a pitting, the section being perpendicular to the longitudinal direction of the weld.
Figure 8:
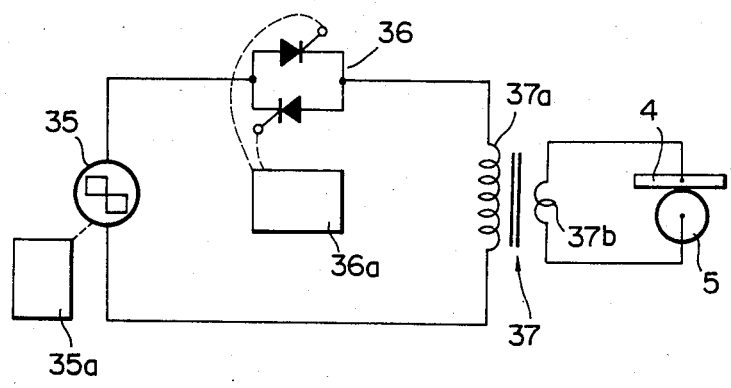
FIG. 8 is a circuit diagram of an example of a welding current generator circuit, the current having a crest factor applied to this invention.

In FIG. 8, a rectangular wave current supply 35, an SCR circuit 36, and a primary coil 37a of a welding transformer 37 are connected in series to constitute a power circuit. Reference numbers 35a and 36a designates control circuits of the power supply 35 and SCR circuit 36, respectively. The power supply 35 is so constructed as to generate a voltage with a rectangular waveform 33 shown in a broken line in FIG. 5.

A secondary coil 37b of the welding transformer 37 is connected to an elongated electrode 44 and a rotary electrode 5.

In the above circuit shown in FIG. 8, turning on the SCR circuit 36 causes a welding current with the waveform 12 to flow through the electrodes 4 and 5. The crest factor Ip/Ie of the welding current can be set by changing a length $t_0$ of the period during which the welding current 12 is zero and/or a length $t_1$ of the period during which the supply voltage 13 is zero by adjusting the control circuits 36a and 35a, respectively. The effective value Ie of the welding current can be set by changing a peak value Vp by adjusting the control circuit 35a.

The microscopic structure of the section (magnification, 50; etched with 5% alcoholic solution of picric acid for 2 minutes) of a weld 11 thus obtained in the longitudinal direction thereof is shown in FIG. 3. A heat affected zone 2 is continuously and substantially uniformly formed in the longitudinal direction of the weld 11. There is none of surface pitting.

For comparison, the other two types of welds were formed under the same conditions as above, except for the following. One used a sinusoidal welding current with a crest factor of 1.41 and with an effective value of 5.3 kA, and the other used welding current with a crest factor of 2.1 obtained when $t_1=0.1$ msec and $t_0=0.4$ msec in FIG. 5 and with an effective value of 4.4 kA.

Figure 2:
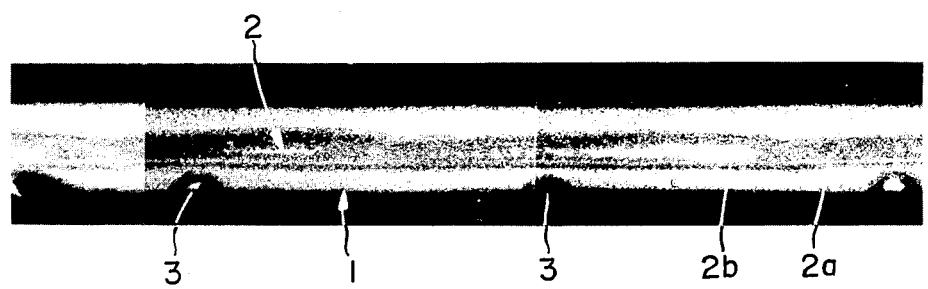
FIG. 2 is a microscopic photograph of the longitudinal section of the weld taken along the line II—II in FIG. 1.

The microscopic sectional structure of the weld 1 formed with the sinusoidal welding current is shown in FIG. 2. While the heat affected zone in continuous, pittings are observed therein.

When the crest factor was 2.1, while the heat affected zone was also continuous, an extreme splash was produced which was difficult to be satisfactorily repaired by lacquering.

What is claimed is:

1. A method of making a welded can body having a mash seam weld which comprises:
    (a) forming a can body preform having a side lapped portion from a blank of a surface treated steel sheet,
    (b) mash seam welding the lapped portion by providing a heat affected zone which is continuous in the longitudinal direction of said weld to assure sealability, while
    (c) supplying said lapped portion with an alternating current of a modified waveform having a crest factor satisfying the expression $1.5 \leq I_p/I_e \leq 2.0$, where $I_3$ and $I_p$ designate an effective value and a peak value, respectively, of said alternating current, whereby said weld is formed with no pitting during said mash seam welding.

2. A method of making a welded can body as claimed in claim 1, wherein said heat affected zone comprises a portion solidified after melted during welding.

3. A method of making a welded can body as claimed in claim 1 wherein said surface treated steel sheet comprises tinfree steel.

4. A method of making a welded can body as claimed in claim 1 wherein said surface treated steel sheet comprises a thin-nickel-plated steel sheet.

5. A method of making a welded can body as claimed in claim 1 wherein said surface treated steel sheet comprises a low-tin tinplate.

6. A method of making a welded can body having a mash seam weld which comprises:

(a) forming a can body preform having a side lapped portion from a blank of a surface treated steel sheet without removing the surface treated film thereof from the marginal edges forming the side lapped portion; and (b) mash seam welding the lapped portion by providing a heat affected zone which is continuous in the longitudinal direction of said weld to assure sealability by using a cooled elongated electrode means and a cooled rotary electrode and wire electrodes interposed between said elongated electrode means and the lapped portion and between the rotary electrode and the lapped portion; while (c) supplying said lapped portion with an alternating current of a modified waveform having a crest factor satisfying the expression $1.5 \leq I_p/I_e \leq 2.0$, where $I_e$ and $I_p$ designate an effective value and a peak value, respectively, of said alternating current; with a contact length L (in mm) between said lapped portion and said rotary electrode which satisfies an expression $3 \text{ mm} \leq L \leq 10 \text{ mm}$; and a frequency f (Hz) of said alternating current, satisfying an expression $0.054L + 0.625 \text{ mm} < P < 0.213L + 0.870 \text{ mm}$, wherein a welding pitch P (mm) is defined by an equation $P = v/120f$, where v designates a welding speed (mm/min.).

* * * * *